United States Patent [19]
Niitsu

[11] Patent Number: 5,373,329
[45] Date of Patent: Dec. 13, 1994

[54] METHOD OF PICTURE MOVEMENT SIGNAL DETECTION AND ASSOCIATED CIRCUIT

[75] Inventor: Shigeo Niitsu, Tokyo, Japan
[73] Assignee: NEC Corporation, Tokyo, Japan
[21] Appl. No.: 833,274
[22] Filed: Feb. 10, 1992

[30] Foreign Application Priority Data

Feb. 15, 1991 [JP] Japan .................. 3-021887

[51] Int. Cl.[5] ........................... H04N 9/64
[52] U.S. Cl. ..................... 348/669; 348/702
[58] Field of Search ............ 358/31, 39, 105, 36; 348/664, 665, 666, 668, 669, 702; H04N 9/64

[56] References Cited

U.S. PATENT DOCUMENTS 5,032,914 7/1991 Fujita .................. 358/105
5,047,840 9/1991 Miki ..................... 358/36
5,132,790 7/1992 Niitsu ................... 358/36

Primary Examiner—Tommy P. Chin
Assistant Examiner—Richard Lee

[57] ABSTRACT

A method of detecting a digital color picture movement signal precisely and economically for three-dimensional processing for the purpose of improving TV and VTR picture quality comprises the steps of detecting the differential between the brightness signals of an input digital color picture signal and the preceding picture delayed one frame period, of detecting in the input signal brightness signal components having frequencies in the vicinity of the color subcarrier frequency, and of allowing the passage of the brightness signal having components in the higher frequency range of the color subcarrier frequency.

9 Claims, 4 Drawing Sheets

METHOD OF PICTURE MOVEMENT SIGNAL DETECTION AND ASSOCIATED CIRCUIT

BACKGROUND OF THE INVENTION

1. Field of the Invention

The present invention relates generally to a circuit for detecting digital color picture movement signals in television receiving equipment (TVs), video tape recorders (VTRs), and so on and relates in particular to a picture movement signal detecting means and its associated circuit.

2. Description of the Related Art

The conventional method of improving picture quality in digital color television receiving equipment and video tape recorders comprises the steps of detecting the motion of the picture by investigating correlations which might exist between different frames in the television picture signal, separating the brightness and color signals, usually referred to as "YC separation," between different frames for a picture with relatively little motion and executing the YC separation within the picture field under consideration in the case of a picture with an abundance of motion. YC separation can be carried out by either line-to-line separation or by frequency separation. A number of picture signal detection circuit arrangements for detecting the picture movement signal, e.g. circuit arrangements using either a set of frame memories which is capable of memorizing information of an amount equivalent to one frame (two fields), 1.5 frames (three fields) and two frames (four fields) are proposed and applied.

In general, it is clear that the more frame memories used, the more precise the detection that can be expected. However, since a frame memory is usually expensive, a detecting circuit using a frame memory of only one frame length and capable of detecting the picture movement signals precisely is desired.

FIG. 1 is a block diagram of an example of a conventional picture movement signal detecting circuit which emphasizes detecting picture movement signals and which uses a frame memory capable of storing one frame length of the color picture signal and a pair of comb filters.

An input signal 301 is a digital color picture signal digitalized by an analog to digital (A/D) converter from a conventional NTSC analog television video signal and is produced by mixing the brightness (Y) and color (C) signals by interleaving, as is usual. The input digital color picture signal 301 is converted to a brightness signal by removing its color signal component by means of a comb filter which consists of a pair of line memories 302, 303, and a pair of adders 304, 305 and which will hereafter be referred to as the first comb filter. The adders in turn serve to add ½ of the signal representing the line under consideration and ¼ each of the signals representing the preceding and the succeeding lines, outputting the brightness signal component contained in the input digital color picture signal 301 without the color component. This is possible because the phase of each adjacent line of NTSC color signals differs by 180°. On the other hand, the input digital color picture signal 301 is converted to a brightness signal delayed by one frame period by inputting through the frame memory 306 and the second comb filter which consists of a pair of line memories 307, 308 and a pair of adders 309, 310.

The differential signal is then output by subtracting the output signals from the two comb filters through the subtracter 311. The differential signal contains only the movement component of the brightness signal. However, when there is no correlation between lines, leakage of a very small amount of the color component from the comb filters is unavoidable. Accordingly, a low-pass filter 312 is provided for removing residual color component to output a pure picture movement signal 313. Unfortunately, however, the low-pass filter 312 also removes the high-frequency component of the brightness movement signal, with the result that a conventional system as explained above cannot distinguish the picture movement signal from the original input digital picture signal in cases when the picture consists of narrow vertical stripes moving horizontally at a rapid rate.

SUMMARY OF THE INVENTION

An object of the present invention is to overcome the inability to detect the rapid horizontal movement of vertical stripes as described in the preceding section and to provide both a method of detecting a picture movement signal and a circuit associated with this method which will suppress the generation of erroneous movement signals caused by color signal leakage and which will work satisfactorily even when the televised picture consists of narrow vertical stripes moving horizontally at a rapid rate.

In order to achieve this and other objects, the method according to the present invention of detecting a picture movement signal by detecting a differential of the brightness signal between an input digital color picture signal and the digital color signal succeeding it by one frame period further comprises the steps of detecting a component of the brightness signal having frequencies in the vicinity of the color subcarrier frequency in the original input digital color picture signal and of allowing the passage of the picture movement signal at higher frequencies when the component of the brightness signal having frequencies in the vicinity of the color subcarrier frequency is detected.

In addition, the picture movement signal detection circuit which detects the differential of brightness signal between an input digital color picture signal and the color picture signal succeeding it by one frame period and removing unwanted residual color signal component and which comprises a brightness signal detecting a component of a means for detecting brightness signal having frequency in the vicinity of the color subcarrier frequency and a means for allowing the passage of the picture movement signals of a higher frequency range when the detecting means detects brightness signal component having frequency in the vicinity of the color subcarrier frequency. The means of allowing the passage of the picture movement signal may be a variable band pass filter.

Another embodiment of the picture movement signal detecting circuit according to the present invention further comprises a color signal detecting means for detecting the color signal component in the input digital color picture signal and generating a stop signal to prevent the passage of the color signal component by reducing a pass bandwidth of the variable band pass filter when it detects a color component exceeding a certain prescribed level, and a means for expanding the pass bandwidth of the variable band pass filter to remove the stop signal when it detects a brightness signal having frequency in the vicinity of the color subcarrier frequency.

In addition, the first color signal detecting means may be a first comb filter consisting of a pair of line memories, a pair of adders, and a subtracter, and the brightness signal detecting circuitry may include a second comb filter consisting of another pair of line memories and another pair of adders.

Moreover, a picture movement signal detecting means is made up of a first color signal detecting means and a brightness signal detecting means which together may use a pair of line memories and an adder as their respective comb filter components.

Still another picture movement signal detecting circuit of the present invention further comprises:

a color signal detecting means for detecting and allowing the passage of color signal components in the input digital color picture signal, a first selector for allowing the passage of the signal detected by the brightness signal detecting means and inhibiting the passage of the color signal through the color signal detecting means upon receiving the signal generated when brightness signals having frequencies in the vicinity of the color subcarrier frequency are detected by the brightness signal detecting means, a first low-pass filter to remove the residual color signal component and a second low-pass filter to allow the passage of brightness signal components of a higher frequency range, a second selector for allowing the passage of the output of the first low-pass filter when the color signal passes through the first selector and stopping the output of the first low-pass filter in order to allow output from the second low-pass filter when the signal detected by the brightness signed component detecting means prevents the passage of the output through the first selector.

Another embodiment of the picture movement signal detecting means of the present invention which comprises a color signal detecting means comprises a first comb filter consisting of a pair of line memories, an adder and a subtracter, and a second band pass filter to allow the passage of the color signal only, and a brightness signal detecting means comprising a second comb filter consisting of a pair of line memories and a pair of adders, and a first band pass filter to allow the passage of only brightness signal components having frequencies in the vicinity of the color sub-carrier frequency.

This invention also includes a picture movement signal detecting means whose color detecting means and brightness signal component detecting means share the use of a pair of line memories and an adder as their respective comb filter components.

These and other objects of the present invention will become apparent from the following description in conjunction with the accompanying drawings.

DETAILED DESCRIPTION OF THE PREFERRED EMBODIMENT

Explanations of several embodiments of the present invention are given below with reference to the attached figures.

Figure 1:
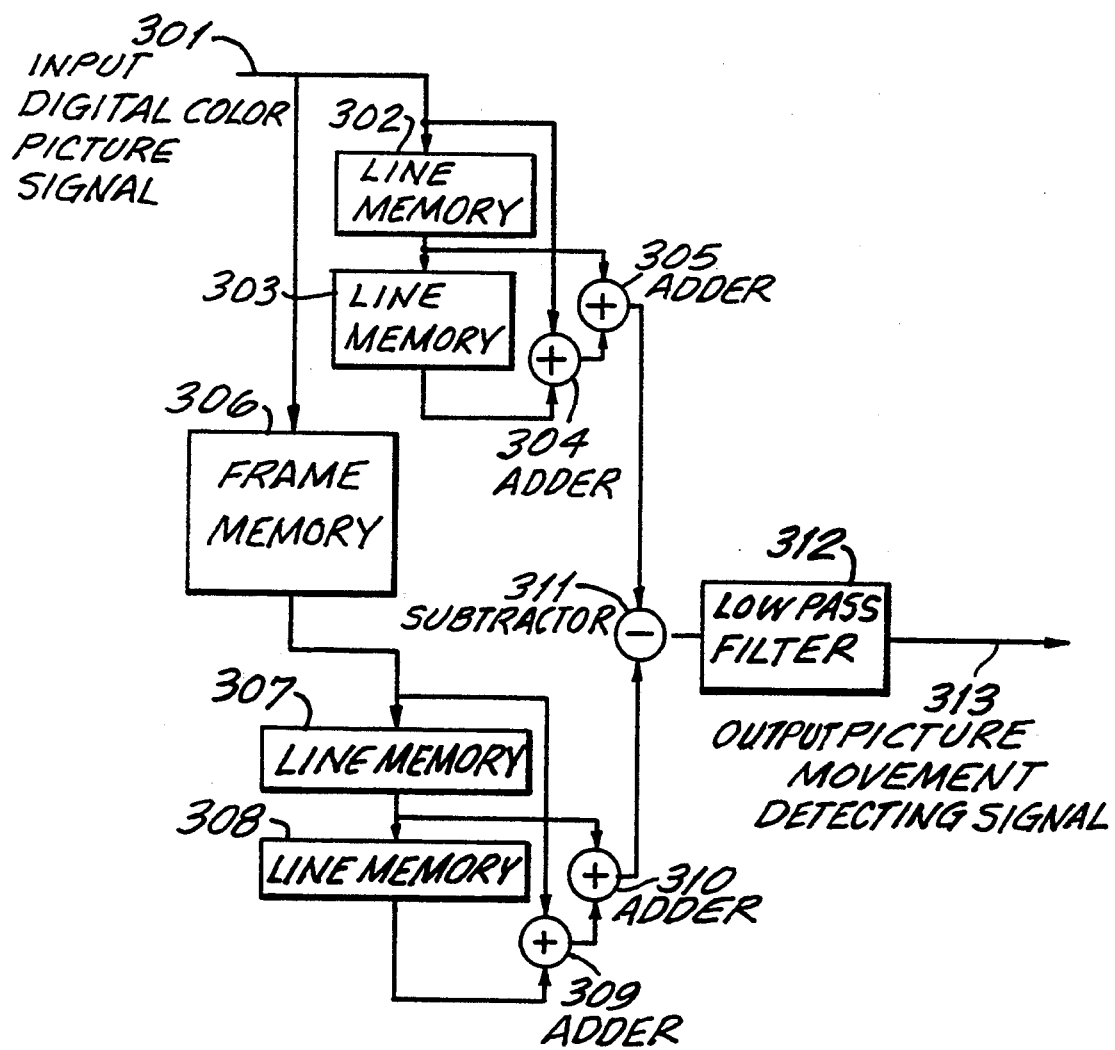
FIG. 1 is a block diagram of an example of a conventional picture movement signal detecting circuit.
Figure 2:
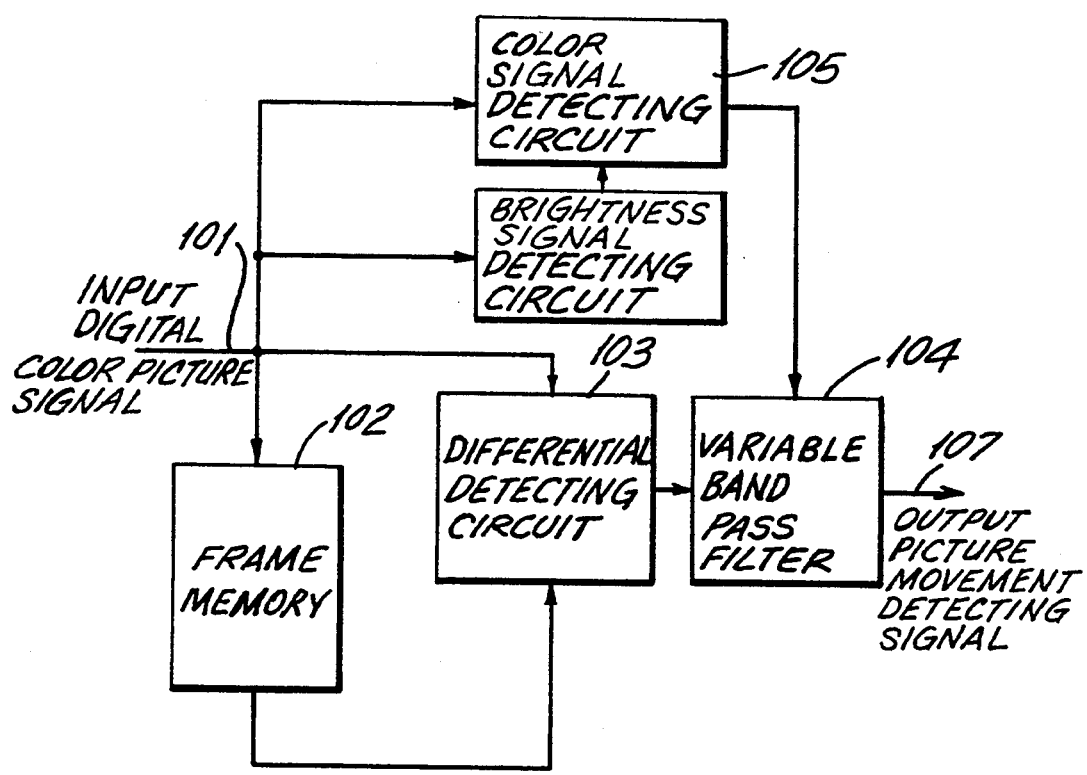
FIG. 2 is a block diagram of the first embodiment of the picture movement signal detecting circuit to which the picture movement signal detecting means of the present invention is applied.

FIG. 2 is a block diagram of the first embodiment of the present invention. The picture movement signal detecting circuit consists of a frame memory 102, a differential detecting circuit 103, a variable band pass filter 104, a color detecting circuit 105 and a brightness detecting circuit 106. The frame memory 102 is identical to conventional frame memories.

The input signal 101 is a digital color picture signal converted from a conventional NTSC analog television video signal which is produced, as usual, by interleaved mixing of the brightness (Y) and color (C) signals. The digitization is executed through a conventional analog to digital (A/D) converter. The input digital color picture signal 101 is a signal inputted to the frame memory 102. The differential signal detecting circuit 103 detects the difference between the picture signals at the input and output terminals of the frame memory 102, and the movement signal of brightness can thus be detected. Since the output of the differential signal detecting circuit 103 might include some residual color component, the pass band of the variable band pass filter 104 is designed to be adjustable so that the pass band width can be varied to restrict the residual color component from passing through freely. At the same time, the color component of the original input digital picture signal 101 is detected by means of the color signal detecting circuit 105. When the detected color component exceeds a prescribed level, the bandwidth of the variable band pass filter 104 is adjusted so as to limit the pass bandwidth in order to suppress the passage of the residual color component. The brightness signal detecting circuit 106 detects brightness signal components in the input digital color picture signal 101 having frequencies in the vicinity of the color sub-carrier frequency of approximately 3.58 MHz, and the signal generated by this detection is used to prevent output from the color signal detecting circuit 105. The pass bandwidth of the variable band pass filter is in this way widened when the input digital color picture signal 101 is rich in brightness signal components having frequencies in the vicinity of 3.58 MHz, and this allows the output of the high-frequency component of the picture movement detecting signal at the output terminal 107.

Figure 3:
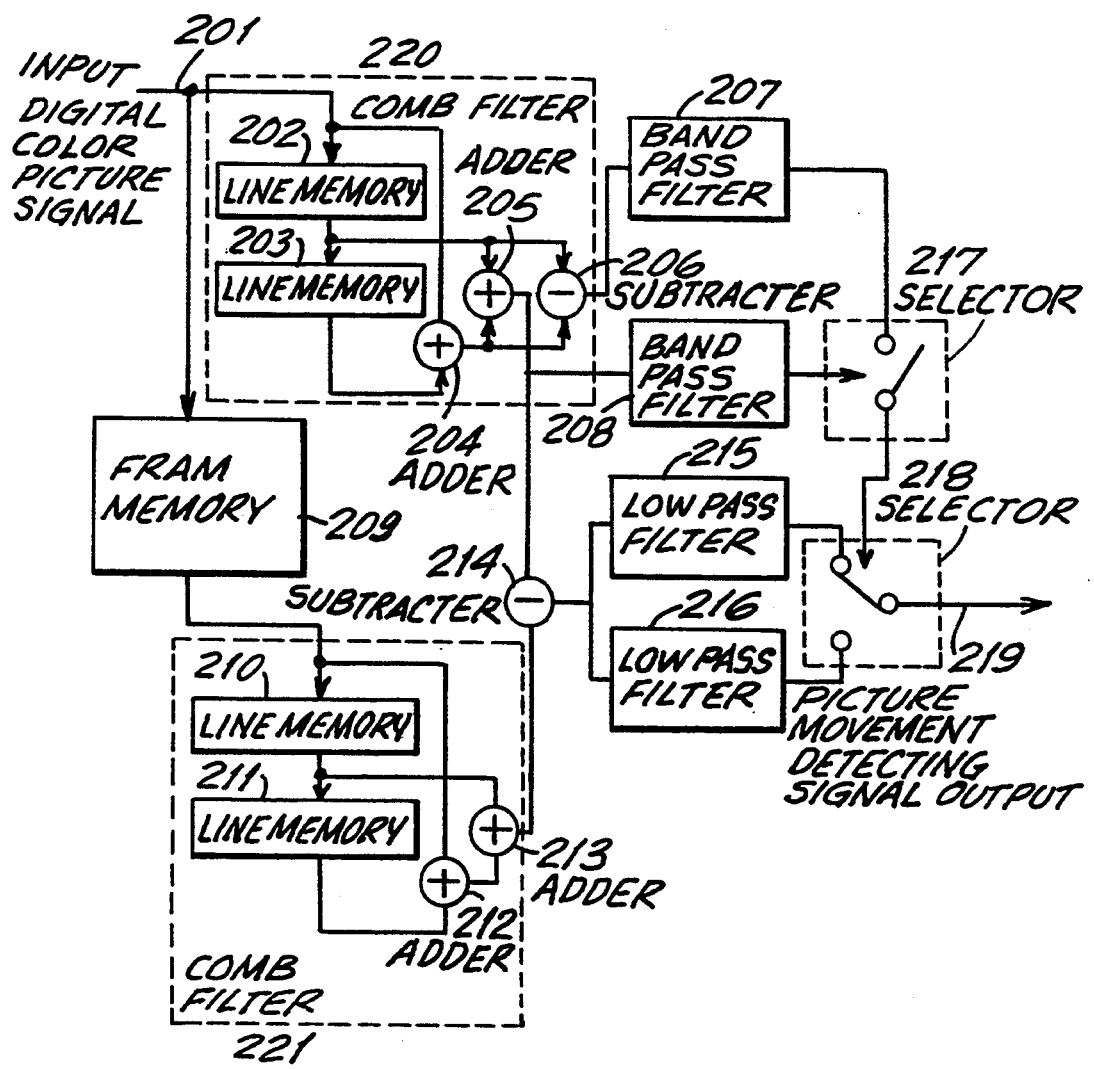
FIG. 3 is the block diagram of a second embodiment of the picture movement signal detecting circuit to which the picture movement signal detecting method of the present invention is applied.

FIG. 3 is a block diagram of a second embodiment of the present invention. The picture movement signal detecting circuit of this embodiment consists of a pair of comb filters 220, 221, a pair of subtracters 206, 214, a frame memory 290, a pair of band pass filters 207, 208, a pair of low-pass filters 215, 216 and a pair of selectors 217, 218.

One comb filter 220, which will hereafter be referred to as the "first comb filter," consists of a pair of line memories 202, 203, a pair of adders 204, 205 and a subtracter 206, and upon input of the digital color picture signal, the brightness signal output is generated through the subtracter 206, and the color signal component is canceled by adding the signals representing the three adjacent lines, i.e. ½ of the signal representing the line under consideration and ¼ each of the signals representing the preceding and succeeding lines.

The frame memory 209 serves to delay the input digital color picture signal 201 by one frame period. The delayed output is converted to the brightness signal by adding the component signals representing the three adjacent lines in a similar manner to the undelayed case described above using another comb filter 221, which will hereafter be referred to as the "second comb filter." The second comb filter consists of a pair of line memories 210, 211 and a pair of adders 212, 213. The subtracter 214 detects the differential between the brightness signals of the field under consideration and the field of the preceding frame and is used to detect the brightness movement signal. The low-pass filter 215 is used to cut off higher frequency portions, i.e. frequencies above 5 MHz of the applied signal. The low-pass filter 216 is used to cut off the higher frequency portion of the same signal, i.e. frequencies in the vicinity of or above 3.58 MHz, in order to eliminate the residual color signal component. The band pass filter 207 is used to extract only the color component of the signal from the subtracter 206 and its peak frequency is 3.58 MHz. The band pass filter 208 is used to extract the brightness signal component of the color sub-carrier frequency of 3.58 MHz from the brightness signal output through the adder 205.

The selector 217 controls the output of the band pass filter 207 by means of the output of the band pass filter 208. The selector 218 controls the output signal of either one of the low pass filters 215 or 216 by means of the output signal of the selector 217 in order to generate picture movement detecting signal output 219.

The operation of the second embodiment of the present invention is as follows:

The input digital color picture signal 201 is delayed for a period of one line by each of the line memories 202, 203. By adding or subtracting the inputs and outputs of the pair of line memories 202, 203 as shown, the brightness and color signal components are obtained. In other words, by adding $\frac{1}{4}$, $\frac{1}{2}$ and $\frac{1}{4}$ portions of the line of signals at three different points, i.e. preceding, between and succeeding the pair of line memories 202, 203, as shown in FIG. 3, the brightness signal component contained in the original input digital color picture signal 201 having the same signal level is obtained at the output terminal of the adder 205. But, since the polarity of the color signal components contained in adjacent lines is reversed alternately, the same addition of the line signals at the said three different points means the addition of $\frac{1}{4}$, $\frac{1}{2}$ and $\frac{1}{4}$ portions, respectively, of the color signal components of the said line signals at the three different points and the resultant color signal component is nullified at the output terminal of the adder 205, meaning that only the brightness signal component is available. By the same token, when the ratio of the addition is $\frac{1}{4}$, $-\frac{1}{2}$ and $\frac{1}{4}$, respectively, the brightness signal component is nullified and the color signal component having the same signal level is available as the output of the adder 205. The residual brightness signal component which might be contained in the color signal output of the subtracter 206 is removed by means of the band pass filter 207 and only the color signal can be obtained at the output of the band pass filter 207. In other words, this output signal is nothing more than the signal representing the colored portions of the entire picture. The first comb filter 220 together with the second band pass filter 208, which has a peak frequency of 3.58 MHz, is designed so as to detect only the color sub-carrier frequency (3.58 MHz) component of the brightness signal and, consequently, the combined circuit detects the high-frequency portion of the brightness signal caused by horizontal stripes. When the signal is output from the circuit, the color signal component from the band pass filter 207 is prevented by means of the first selector 217.

At first glance, the picture movement signal should be obtainable by means of directly subtracting the output signal of the frame memory 209 from the input signal of the same frame memory 209, but the fact is that the residual color signal component is usually significant and cannot be neglected, and therefore, this arrangement is not recommendable in practice. It might seem better to subtract the output signal of the second comb filter 221 from the output of the first comb filter 220 by means of the subtracter 214. The two signal outputs both consist of only the brightness components and contain no residual color signal components. Therefore, the difference signal in this case seems to be perfectly satisfactory. When the televised picture pattern is rich in vertical correlations, nothing is wrong with this arrangement, and the difference signal can in fact be used as the brightness movement signal. However, when a picture pattern has few vertical correlations, a very small amount of leakage of the color signal component is unavoidable with the arrangement at the output terminal of the subtracter 214. When there is a color signal component having frequencies in the vicinity of the color subcarrier frequency of 3.58 MHz, the color signal from the first band pass filter 207 passes through the first selector 217 and actuates the second selector 218 to engage the first low-pass filter 216 designed to prevent passage of signals above 3.58 MHz and, in this way, color signal components having frequency components in the vicinity of 3.58 MHz are removed and the picture movement detecting signal 219 becomes available as the output of the detecting circuit.

The higher frequency portion of the brightness movement signal, caused, for example, by the horizontal movement of vertical stripes, is also removed in this arrangement because the output of the second low-pass filter 216 does not contain the frequency component of the brightness movement signal in the vicinity of 3.58 MHz. Furthermore, the output of the first low-pass filter 216 is selected and passed by means of the pair of selectors 217 and 218, which are both controlled by signals which are generated only when a color signal component exists. When no color signal component exists or when a large portion of the brightness signal component has frequency in the vicinity of 3.58 MHz, the brightness movement signal is passed through the second low-pass filter 215, and this allows the passage of a signal having frequencies of up to the vicinity of 5 MHz. Thus, it is possible to generate picture movement detecting signal output 219 without error.

Figure 4:
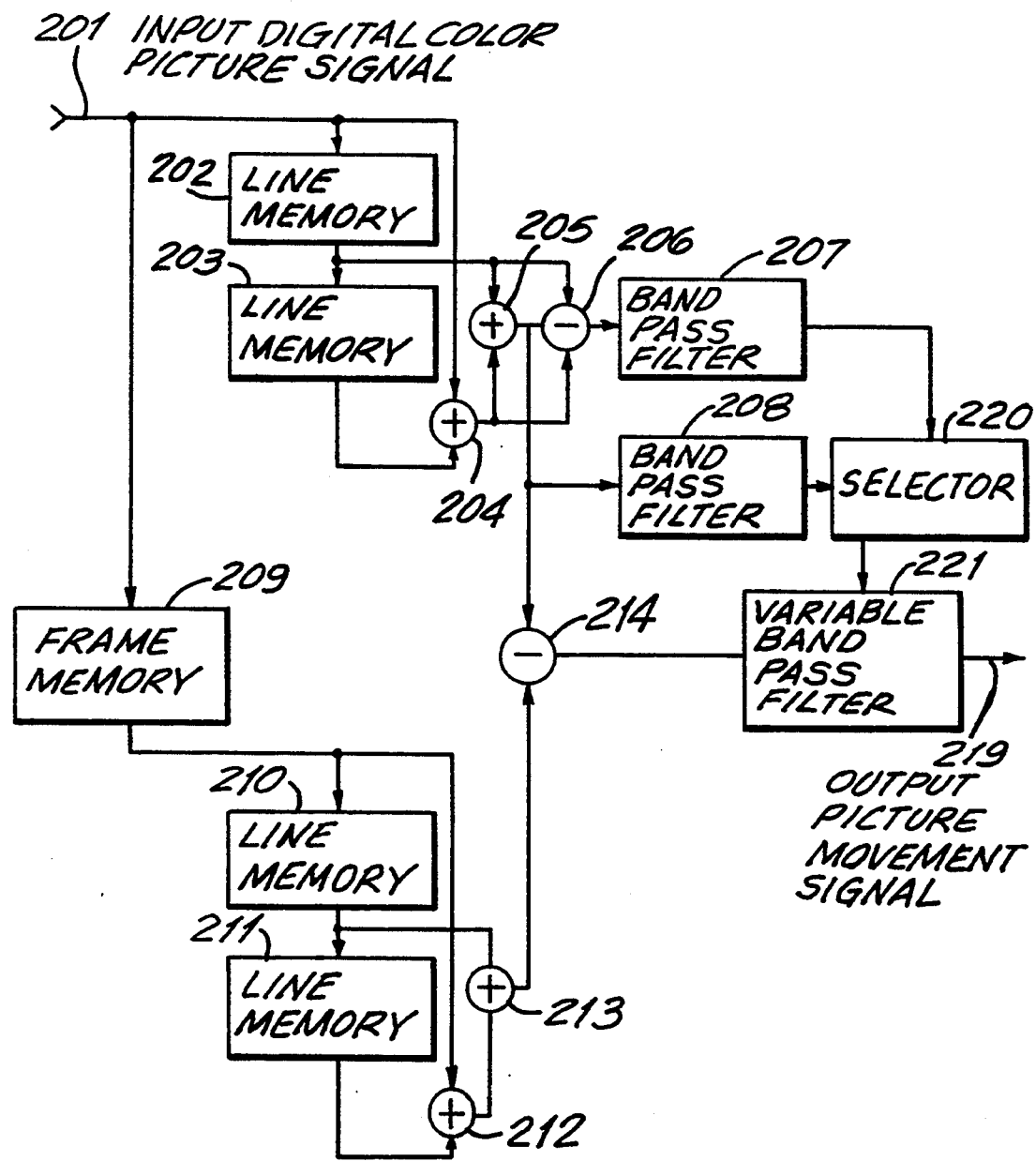
FIG. 4 is the block diagram of yet another embodiment of the detecting circuit of the invention.

FIG. 4 shows a picture movement detecting circuit similar to that of FIG. 3 but provided with a variable band pass filter 221 (as in the embodiment of FIG. 2) connected between a selector 220 receiving signals from the band pass filters 207 and 208, and the subtractor 214 and outputting a picture movement signal 219.

While certain representative embodiments have been described for the purpose of illustrating the invention, it will be apparent to one skilled in the art that various changes and modifications may be made therein without departing from the spirit or scope of the invention.

I claim:

1. Method of detection of a picture movement signal generated from an input digital picture signal including brightness and color signal components, the method comprising the steps of detecting a differential of brightness signal components between an input digital color picture signal and a preceding digital color picture signal delayed one frame period, detecting brightness signal components having frequencies in the vicinity of a color subcarrier frequency in the input digital color picture signal to detect distortions in the picture movement signal, providing a variable band pass filter means which outputs a picture movement signal and allowing a passage of a picture movement signal of a higher frequency than said color subcarrier frequency, through said variable band pass filter means when a brightness signal component having frequency in the vicinity of the color subcarrier frequency is detected.

2. A picture movement signal detecting circuit for detecting a picture movement signal, comprising means for detecting a differential of brightness signals including means for subtracting brightness signal components of an input digital color picture signal from brightness signal components of the preceding digital color picture signal delayed one frame period and removing unwanted residual color signal component; a brightness signal detecting means for detecting brightness signal components having frequencies in the vicinity of color subcarrier frequency; and an output means connected to said brightness signal detecting means for outputting a picture movement signal, said output means being configured for allowing a passage therethrough of the picture movement signal at a higher frequency range than the color subcarrier frequency, upon detecting said brightness signal components having frequencies in the vicinity of the color subcarrier frequency.

3. A picture movement signal detecting circuit described in claim 2, wherein the output means of allowing the passage of the picture movement signal is a variable band pass filter.

4. A picture movement signal detecting circuit described in claim 3, and further comprising a color signal detecting means coupled to said variable band pass filter, and detecting a color signal component in the input digital color picture signal, means for reducing a pass bandwidth of the variable band pass filter for generating a stop signal to prevent a passage of the color signal component contained in said picture movement signal through said variable band pass filter, said reducing means reducing the pass bandwidth of the variable band pass filter, upon detection of the color signal component exceeding a predetermined level, and means for expanding the pass bandwidth of the variable band pass filter to avert the stop signal, upon detecting the brightness signal components having frequencies in the vicinity of the color subcarrier frequency.

5. A picture movement signal detecting circuit described in claim 4 wherein said color signal detecting means includes a first comb filter consisting of a pair of line memories, an adder and a subtracter, and the brightness signal detecting means includes a second comb filter consisting of a pair of line memories and a pair of adders.

6. A picture movement signal detecting circuit described in claim 5 wherein the color signal detecting means and the brightness signal detecting means share the use of a pair of line memories and an adder as respective comb filter components thereof.

7. A picture movement signal detecting circuit described in claim 2, and further comprising a color signal detecting means for detecting and allowing the passage through said color signal detecting means of color signal components contained in an input digital color picture signal, a first selector for prohibiting the passage of a color signal component through the output means and allowing the passage through said output means of a signal generated when a brightness signal component having a frequency in the vicinity of the color subcarrier frequency is detected by the brightness signal detecting means, said output means including a first low-pass filter to remove the residual color signal component a second low-pass filter to allow the passage through said output means of the picture movement signal of a higher frequency range than the color subcarrier frequency, and a second selector for allowing the passage of an output of the first low-pass filter therethrough when the color signal passes through the first selector and to prohibit output of said first low-pass filter in order to allow output of said second low pass-filter when the signal generated by the brightness signal detecting means is inputted through the first selector.

8. A picture movement signal detecting circuit described in claim 7, wherein the color signal detecting means comprises a first comb filter consisting of a pair of line memories, an adder and a subtracter, and a first band pass filter which allows the passage of only the color signal to said first selector, and said brightness signal detecting means comprises a second comb filter consisting of a pair of line memories and a pair of adders, and a second band pass filter to allow the passage to said second selector of only said brightness signal components having frequencies in the vicinity of the color subcarrier frequency.

9. A picture movement signal detecting circuit described in claim 8 wherein the color signal detecting means and the brightness signal detecting means share the use of a pair of line memories and an adder as respective comb filter components thereof.

* * * * *